United States Patent [19]
Honma et al.

[11] Patent Number: 6,100,534
[45] Date of Patent: Aug. 8, 2000

[54] MICROSCOPIC AREA SCANNING APPARATUS

[75] Inventors: Katsunori Honma; Hiroshi Muramatsu; Norio Chiba, all of Chiba, Japan

[73] Assignee: Seiko Instruments Inc., Japan

[21] Appl. No.: 09/097,478

[22] Filed: Jun. 15, 1998

[30] Foreign Application Priority Data

Jun. 16, 1997 [JP] Japan .................................... 9-159004

[51] Int. Cl.$^7$ .................................................. G21K 5/10
[52] U.S. Cl. ..................................... 250/442.11; 310/328
[58] Field of Search .......................... 250/442.11, 440.11; 310/328

[56] References Cited

U.S. PATENT DOCUMENTS 5,103,095  4/1992  Elings et al. ........................ 250/442.11

Primary Examiner—Kiet T. Nguyen
Attorney, Agent, or Firm—Adams & Wilks

[57] ABSTRACT

A microscopic area scanning apparatus is provided with at least three hollow cylindrical piezoelectric elements each driven in three XYZ directions by one of divided electrodes. Three or more hollow cylindrical piezoelectric elements are arranged on a circumference of a common plane. Balls are each axially provided at a free end of the hollow cylindrical piezoelectric element. Ball retainers rotatably and slidably support a respective ball in contact therewith. A sample stage is fixed to the ball retainers. A table fixes the hollow cylindrical piezoelectric elements on the circumference of the common plane. Thus, the microscopic area scanning apparatus can realize both a wide X-Y scanning range and a high Z-direction resonant frequency without utilizing an elastic hinge.

10 Claims, 3 Drawing Sheets

SCANNING DIRECTION

MICROSCOPIC AREA SCANNING APPARATUS

BACKGROUND OF THE INVENTION

This invention relates to a microscopic area scanning apparatus used for scanning over a sample placed on a scanning probe microscope (SPM) that is represented by an atomic force microscope (AFM) or a scanning near optical field microscope (SNOM), wherein at least three hollow cylindrical piezoelectric elements are provided each of which is driven in three XYZ directions by one of divided electrodes.

The scanning probe microscope (SPM) is an apparatus for scanning over a sample surface by using a mechanical prove (hereinafter called "probe") to thereby detect an interaction between the probe and the sample surface, performing observation on the sample surface on the order of nm ($10^{-6}$) or lower. For example, the atomic force microscope (AFM) as one typical form of the scanning probe microscope can detect an interatomic force acting between a probe and a sample surface to give information in the form of a change in probe deflection, thus effecting observation on a surface geometry of the sample.

These microscopes require a microscopic area scanning apparatus, in order to scan over samples.

The conventional microscopic area scanning apparatus has three hollow cylindrical piezoelectric elements that are vertically arranged at an interval of an equal angle on a circumference of a common plane. A sample stage is formed by a parallel flat plate, and connected to elastic members having a rotational fulcrum, such as elastic hinges, respectively arranged at free ends of the three hollow cylindrical piezoelectric members. The reason of providing three in number of the hollow cylindrical piezoelectric elements is to support the sample stage at three points. The advantages of the three-point support lies in that the sample stage is placed always in contact with all the free ends of the hollow cylindrical piezoelectric elements regardless of the precision of installation of the hollow cylindrical piezoelectric elements.

Here, the use of the elastic hinges between the hollow cylindrical piezoelectric elements and the sample stage is due to the following reasons.

To scan over the sample stage in a horizontal direction (hereinafter referred to as "XY directions") on a microscopic area scanning apparatus structured as above, the three hollow cylindrical piezoelectric elements have to be deformed by a same displacing amount in a same direction. At this time, the free end of the hollow cylindrical piezoelectric element moves through a circular path about a support end of the hollow cylindrical piezoelectric element. Accordingly, the free end of the hollow cylindrical piezoelectric element increases in inclination as a distance of scan increases.

Considering a case of directly fixing a sample stage on the hollow cylindrical piezoelectric elements, the free ends of the hollow cylindrical piezoelectric elements and the fixing surface of the sample stage to be fixed thereon are kept in contact, in a definite plane, with each other. Where the sample stage is formed by a parallel flat plate with rigidity, the fixing surface of the sample stage cannot follow the tilt in the hollow cylindrical piezoelectric elements. The free ends and the sample stage move away from each other. Due to this, the hollow cylindrical piezoelectric element is acted upon by a bend-resisting force caused by the sample stage. This resisting force reduces the amount of displacing the sample stage with respect to an amount of displacement to be intrinsically caused by the individual hollow cylindrical piezoelectric member. In an extreme case, the hollow cylindrical piezoelectric element cannot withstand to the resisting force, resulting in fracture.

If the sample stage is made by an elastic parallel flat plate in order to avoid such a situation, the fixing surface of the sample stage inclines with increase in inclination of the free ends of the hollow cylindrical piezoelectric element. This, however, causes deflection in the surface of the sample stage. This deflection in turn causes a sample on the sample stage to move following the deflection of the sample stage surface. As a result, when scanning over the sample stage in the XY directions, information on the sample surface geometry detected by the probe positioned above the sample surface is affected by the deflection of the sample stage mixed into the intrinsic sample-surface geometry.

In order to solve the above phenomena, it is usual practice to adopted a method with a structure having a sample stage formed by a rigid member and elastic members having a rotational fulcrum, such as an elastic hinge, arranged for connecting between the sample stage and the hollow cylindrical piezoelectric elements. With this structure, the inclination of the hollow cylindrical piezoelectric element at their free end is absorbed by the deformation of the elastic hinge about its rotational fulcrum. There is no transmission of deflection to a sample on the sample stage, and the information on a sample-surface geometry detected by the probe becomes coincident with the intrinsic sample geometry.

Referring to FIG. 5, there is shown a typical view showing one structural example of a conventional microscopic area scanning apparatus. In FIG. 5, three hollow cylindrical piezoelectric elements 101 (two are shown in the figure) are vertically fixed at an equal interval of 120 degrees on a circumference of a same horizontal plane of the table 105 so that their free ends have coincident heights. Each hollow cylindrical piezoelectric element 101 is axially fixed with an elastic hinge 501 at a top free end. A sample stage 104 is fixed on the totally three elastic hinges 501. The elastic hinge 501 is in a drum form having a neck at a center portion, which is fixed with its drum axis coincident with an axis of the hollow cylindrical piezoelectric element. The neck of the elastic hinge 501 serves as a rotational fulcrum. The elastic hinge 501 is bent depending upon bending deformation of the hollow cylindrical piezoelectric element 101. The material of the elastic hinge 501 uses phosphor bronze that is high in elastic constant and excellent in workability. The material of the sample stage 104 uses an aluminum alloy or stainless steel that has substantial rigidity.

Referring to FIG. 6, there is shown a typical view showing operation of the conventional microscopic area scanning apparatus under scanning in the XY directions, wherein a state is shown that three hollow cylindrical piezoelectric elements 101 (two are shown in the figure) is actuated leftward as viewed on the paper. In this state, the hollow cylindrical piezoelectric elements 101 at their free ends are tilted by a certain angle. On the other hand, the sample stage 104 is kept in a horizontal state. The difference in angle between the free end of the hollow cylindrical piezoelectric element 101 and the sample table 104 is absorbed by bending the neck as a rotational center of the elastic hinge 501.

With such a structure, however, the presence of the elastic hinge decreases a resonant frequency in a height direction (hereinafter referred to as "Z" direction) of the microscopic area scanning apparatus as compared with that of the single hollow cylindrical piezoelectric element. In a scanning probe microscope (SPM), the Z-direction resonant frequency requires at least 1 kHz or higher in order to follow a geometry of a sample surface, even where the scanning rate in the XY directions is at a minimum about 0.5 Hz.

Further, as the scanning range increases broader in the XY directions, the higher the Z-direction resonant frequency is required. In the above-stated structure, the elastic constant of the elastic hinge has to be decreased as the XY scanning range is broadened. Thus, the resonant frequency is lowered. That is, the broad X-Y scanning range and the Z-direction resonant frequency are in a trade-off relationship.

SUMMARY OF THE INVENTION

Therefore, it is an object of the present invention to provide a microscopic area scanning apparatus which can realize both of a wide X-Y scanning range and a high Z-direction resonant frequency without utilizing an elastic hinge.

A microscopic area scanning apparatus according to the present invention is used for scanning over a sample placed on a scanning probe microscope (SPM) that is represented by an atomic force microscope (AFM) or a scanning near optical field microscope (SNOM), wherein at least three hollow cylindrical piezoelectric elements are provided each which is driven in three XYZ directions by one of divided electrodes. The microscopic area scanning apparatus comprises: three or more hollow cylindrical piezoelectric elements arranged on a circumference of a common plane; a plurality of balls each axially provided at a free end of the hollow cylindrical piezoelectric element; a plurality of ball retainers each for rotatably and slidably holding a respective ball in contact therewith; a sample stage fixed to the ball retainers; and a table for fixing the hollow cylindrical piezoelectric elements on the circumference of the common plane, the table being provided at a fixed end of the hollow cylindrical piezoelectric elements.

DETAILED DESCRIPTION OF THE PREFERRED EMBODIMENTS

Figure 1:
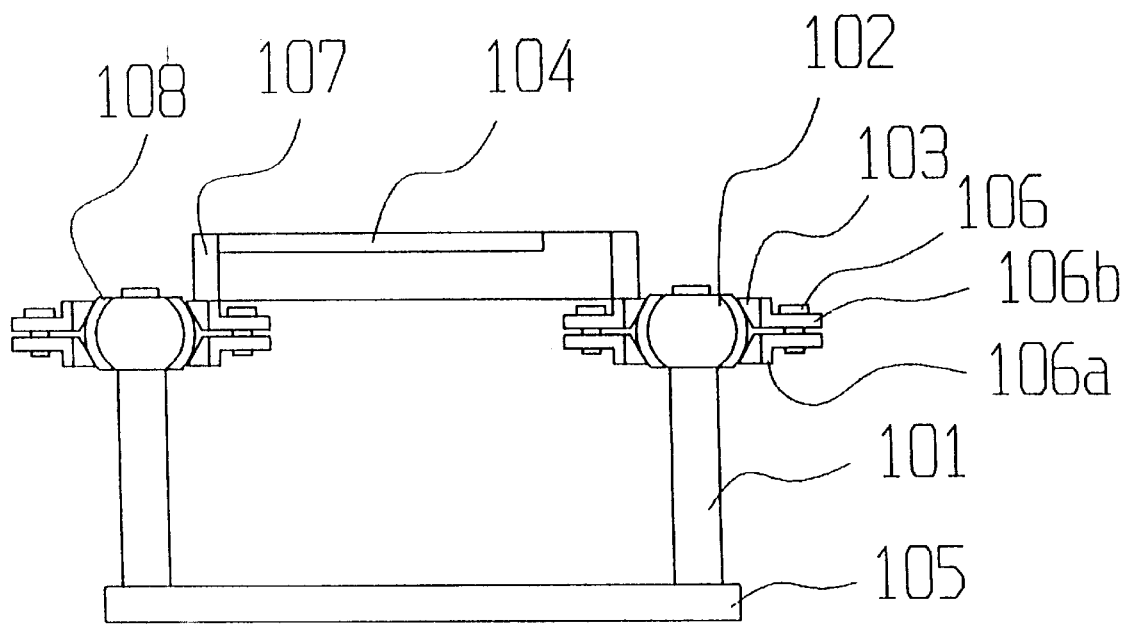
FIG. 1 is a typical view showing one structural example of a microscopic area scanning apparatus according to a first embodiment of the present invention.

The present invention will now be explained based on embodiments with reference to the drawings.
(1) First Embodiment Referring to FIG. 1, there is illustrated an microscopic area scanning apparatus according to a first embodiment of the present invention. In FIG. 1, three hollow-cylindrical piezoelectric elements 101 (two are shown in the figure) are vertically fixed at an interval of 120 degrees on a horizontal circumferential plane of a table 105 such that their top free ends are equal in height to one another. Each of the hollow cylindrical piezoelectric elements 101 each have a ball 102 axially held on the top free end by bolt. This ball 102 is slidably fitted by upper and lower halves of exactly the same two ball retainers 103 having a hole in an bottomless cup form. The ball 102 and the ball retainer 103, at least one of them, is formed by a surface film of a soft metal or a solid lubricant in order to provide smoothness at a surface thereof. With this structure, there is no necessity of applying a lubricating oil or grease to the ball 102 and the ball retainer 103. Consequently, it is possible to prevent drift or creep from occurring due to the lubricating oil or grease. The use in a vacuum is also available.

The ball is desirably formed of phosphor bronze or stainless steel (SUS304 or the like) polished at the surface to have a surface film 108 formed by ion plating of a soft metal such as gold, silver, or lead. The surface film 108 may be alternatively formed by sputtering with molybdenum disulfide as a solid lubricant. Besides, a copper-based alloy (sintered bearing alloy) containing a solid lubricant may be used.

Meanwhile, the ball retainer 103 may use a SKS material (alloy tool steel) polished at a surface, an SUJ material (bearing steel) plated by a hard chromium plating, or a surface-polished stainless steel (SUS304 or the like). Although in this embodiment the surface film 108 is provided on the surface of the ball 102, a surface film 108 may be formed on the ball retainer 103 similarly to the ball 102.

The upper and lower ball retainers 103 are press-fitted in respective holders 106a. Each of these two holders 106a is provided with a flange 106b. The both flanges 106b have bolts arranged, at right and left symmetric locations, to penetrate through a gap defined therebetween. The flange 106b uses a plate material of a stainless steel (SUS304-CSP) or a spring phosphor bronze to have an elasticity. This elasticity is desirably given to such a degree that a resonant frequency is not lowered for the microscopic area scanning apparatus. With such a structure, the gap between the two flanges 106b is adjusted by tensioning the bolts 106 to thereby control the exerted pressure to the ball 102. This allows a frictional force acting between the surface film 108 of the ball 102 and the ball retainer 103 to be controlled to a desired magnitude. As this frictional force is intensified, a coupling rigidity of the ball 102, the surface film 108 and the ball retainer 103 increases to increase the resonant frequency in XYZ directions of the microscopic area scanning apparatus.

A sample stage 104 is fixed to one inner point of a ring member 107. The fixed position of the sample stage 104 to the ring member 107 is fixed with one ball retainer 103. The remaining two ball retainers 103 are fixed to the ring member 107. The ring member 107 is designed to have a rigidity with respect to a radial direction lower than that of the sample stage 104. The ring member 107 also has a rigidity with respect to a Z direction equivalent to a rigidity of the sample member 104 with respect to the Z direction. In this structure, errors in XY directions of the hollow cylindrical piezoelectric elements are absorbed by radial deflection of the ring member 107. The ring member 107 has its rigidity low in a radial direction but high in a height direction, having no effects upon resonant frequency with respect to the Z direction.

The sample stage 104 is substantially of a rigid member, and uses a material that is light in weight without deviation in mass. The sample member 104 is formed desirably of an aluminum alloy (e.g. A6061, A5052) or a thin stainless plate (e.g. SUS304) in a disc form with a rib for enhancing rigidity. This structure provides a higher resonant frequency characteristic in Z direction than the conventional structure to the microscopic area scanning apparatus while scanning in X and Y directions as the conventional.

(2) Second Embodiment

Figure 2:
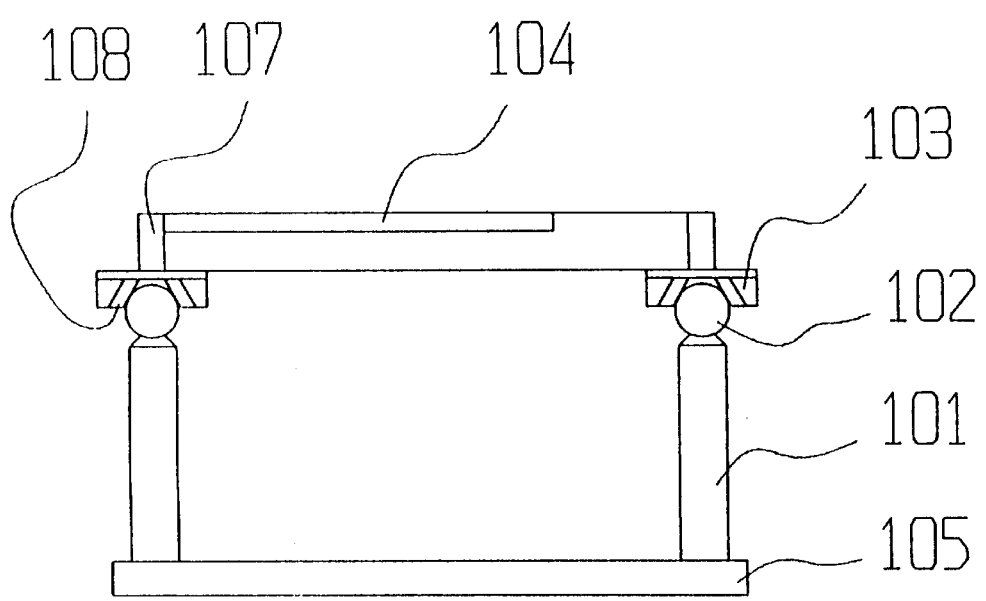
FIG. 2 is a typical view showing one structural example of a microscopic area scanning apparatus according to a second embodiment of the present invention.

At Referring to FIG. 2, there is illustrated a second embodiment of a microscopic area scanning apparatus of the present invention. In FIG. 2, three hollow-cylindrical piezoelectric elements 101 are vertically fixed at an interval of 120 degrees on a horizontal circumferential plane of a table 105 such that their top free ends are equal in height to one another. The hollow cylindrical piezoelectric elements 101 each have a ball 102 comprising a magnetic material axially held on the top free end by adhesion.

This ball 102 is fitted and covered on a ball retainer 103 formed of a permanent magnet material having a hole in a bottomless cup form.

The ball 102 and the ball retainer 103, at least one of them, is formed by a surface film of a soft metal or solid lubricant in order to provide smoothness at a surface thereof. In this embodiment, a surface film 108 is formed on the ball retainer 103.

In this structure, there is no necessity of applying a lubricating oil or grease to the ball 102 and the ball retainer 103. Consequently, it is possible to prevent drift or creep from occurring due to the lubricating oil or grease. The use in a vacuum is also available.

The ball 102 uses a magnetic material such as a ferromagnetic material, desirably a ferromagnetic stainless steel (SUS420J2, SUS440C, etc.) having a polished surface and electroless plated with nickel. The ball retainer 103 uses a permanent magnetic material high in holdability, desirably a neodymium (Nd) based material polished and nickel plated to have a surface film formed thereon of gold, silver, lead, molybdenum disulfide or the like, or a samarium-cobalt (Sm—Co) based material polished to form thereon a surface film 108 of gold, silver, lead, molybdenum disulfide or the like.

Although in this embodiment formed the surface film 108 is formed on the ball retainer 103, the ball 102 may be formed, at a surface, with a surface film 108 using a soft metal such as gold, silver or lead or a solid lubricant such as molybdenum disulfide.

Where the ball 102 is of a permanent magnet or electromagnet and the ball retainer 103 is of a magnetic material as discussed above, the ball 102 can be exerted by pressure due to a magnetic force acted by between the ball 102 and the ball retainer 103. If the ball 103 is made of an electromagnet, the frictional force between the ball 102 and the ball retainer 103 can be adjusted to a desired degree by controlling a magnetic force applied between the ball 102 and the ball retainer 103.

A sample stage 104 is fixed to one inner point of a ring member 107. The fixed position of the sample stage 104 to the ring member 107 is fixed with one ball retainer 103. The remaining two ball retainers 103 are fixed to the ring member 107. The ring member 107 is designed to have a rigidity with respect to a radial direction lower than that of the sample stage 104. The ring member 107 also has a rigidity with respect to a Z direction equivalent to a rigidity of the sample stage 104 with respect to the Z direction. In this structure, errors in XY directions of the hollow cylindrical piezoelectric elements are absorbed by radial deflection of the ring member 107. The ring member 107 has its rigidity low in a radial direction but high in a height direction, having no effects upon resonant frequency with respect to the Z direction.

The sample stage 104 is substantially of a rigid member, and uses a material that is light in weight without deviation in mass. The sample member 104 is formed desirably of an aluminum alloy (e.g. A6061, A5052) or a thin stainless plate (e.g. SUS304) in a disc form with a rib for enhancing rigidity. This structure provides a higher resonant frequency characteristic in Z direction than the conventional structure to the microscopic area scanning apparatus while scanning in X and Y directions as the conventional.

Figure 3:
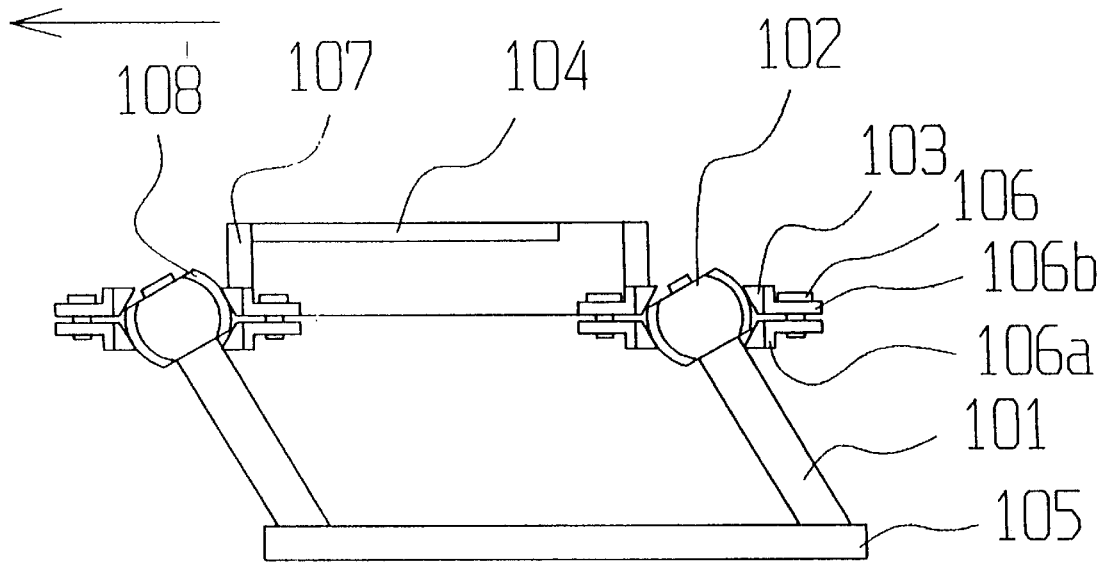
FIG. 3 is a typical view showing the operation of the microscopic area scanning apparatus in XY scanning of the first embodiment of the present invention.

Referring to FIG. 3, there is shown a typical view in operation of the microscopic area scanning apparatus of the first embodiment of the present invention.

To scan over the sample stage 104 in an arrow direction as viewed in the figure, the three hollow cylindrical piezoelectric elements 101 (two in number in the figure) may be moved by bending in a same amount and in a same direction. On this occasion, each of the balls 102 placed at the respective free end of the hollow cylindrical piezoelectric members moves along a circular path about the fixed end of the hollow cylindrical piezoelectric member 101.

The ball 102 is in a slidable linear contact with the ball retainer 103 through the surface film 108. The movement of the hollow cylindrical piezoelectric element 101 due to inclination, i.e. the movement of the ball 102 due to inclination, is absorbed by sliding between the ball 102 and the ball retainer 103. Thus, the circular-path motion of the ball 102 is transformed into linear motion in the ball retainer 103.

The ball 102 is in linear contact with the ball retainer 103 through the surface film 108. The linear contact allows the ball 102 to be applied by a force, thus providing a high Z-directional coupled rigidity as compared with connection by an elastic hinge.

Also, the frictional slide with the ball 102 and the ball retainer 103 exhibits an extremely low frictional coefficient of approximately 0.002–0.003. This value is as low as approximately one-tenth of surface-contact frictional coefficient (approximately 0.3). There is no tendency of causing smoothless motion (hereinafter referred to as stick-slip phenomenon), with a capability of precise movement. Thus, the combination of the ball 102 and the ball retainer 103 is preferred as an element for the microscopic range scanning apparatus.

Therefore, it is possible to scan over the sample stage 104 with smoothness without causing stick-slip phenomenon during its movement from a start of scan, i.e. the state of FIG. 1 to a mid-process of scan, i.e. the state of FIG. 3.

Figure 4:
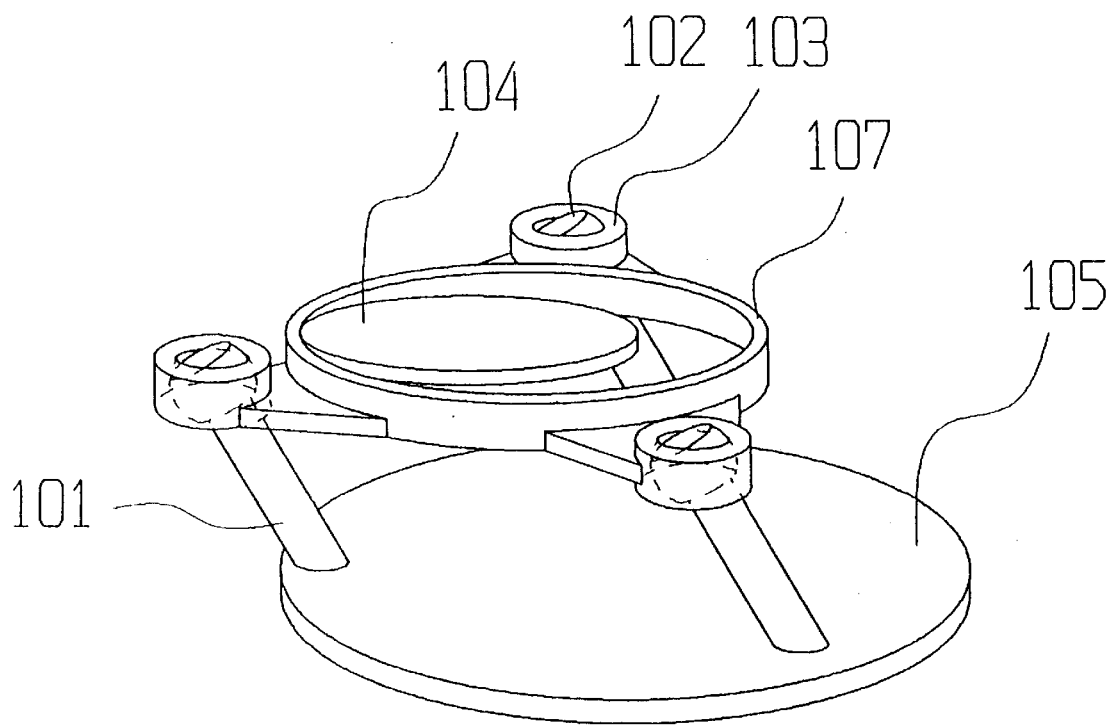
FIG. 4 is a perspective view showing one structural example of a displacing error absorbing means of the microscopic area scanning apparatus of the present invention.
Figure 5:
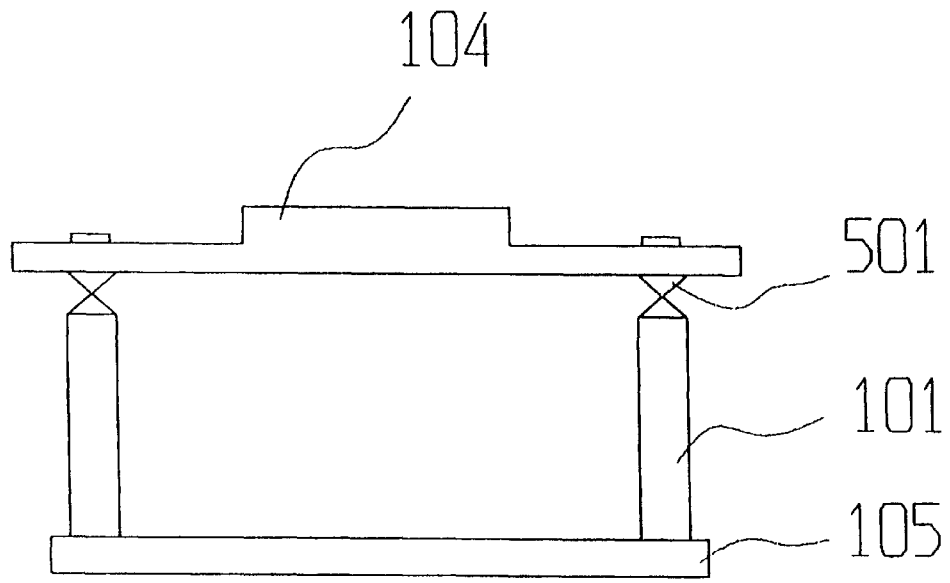
FIG. 5 is a typical view showing one structural example of a conventional microscopic area scanning apparatus.
Figure 6:
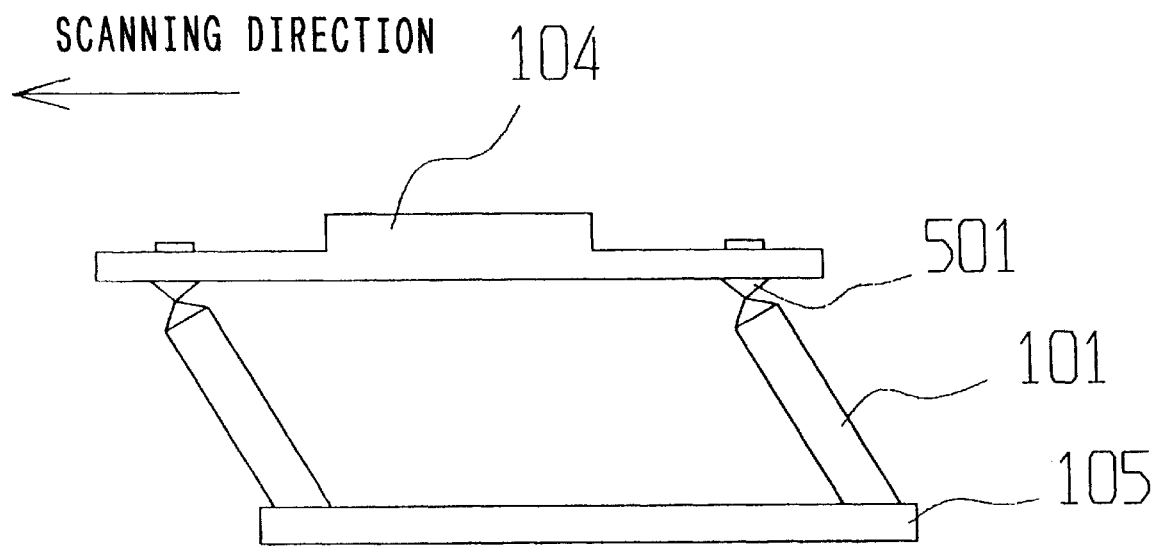
FIG. 6 is a typical view showing the operation of a conventional microscopic area scanning apparatus in XY scanning.

Referring to FIG. 4, there is illustrated a perspective view of a displacement-error absorbing means as one structural example of the microscopic area scanning apparatus of the present invention. The displacement-error absorbing means has a structure that a ring member 107 inscriptively fixed with a sample stage 104, wherein one ball retainer 103 fixed to a fixing portion for the ring member 107 and the sample stage 104 and remaining two ball retainers 103 fixed to the ring member 107. The error caused in horizontal displacement of the hollow cylindrical piezoelectric elements encountered during X-Y scanning is absorbed by radial deflection of the ring member 107. Since the rigidity of the ring member 107 is low in a radial direction but high in a height direction, the deflection in the ring member 107 has no effect upon the resonant frequency in the Z direction.

As explained above, this invention is a microscopic area scanning apparatus used for scanning over a sample placed on a scanning probe microscope (SPM) that is represented by an atomic force microscope (AEM) or a scanning near optical field microscope (SNOM), wherein at least three hollow cylindrical piezoelectric elements are provided each of which is driven in three XYZ directions by one of divided electrodes. The microscopic area scanning apparatus comprises: three or more hollow cylindrical piezoelectric elements arranged on a circumference of a common plane; a plurality of balls each axially provided at a free end of the hollow cylindrical piezoelectric element; ball retainers each for rotatably and slidably holding a plurality of a respective ball in contact therewith; a sample stage fixed to the ball retainers; and a table for fixing the hollow cylindrical piezoelectric elements on the circumference of the common plane. Therefore, the present invention has an effect to solve the problem raised by the conventional microscopic area scanning apparatus, and realize a microscopic area scanning apparatus satisfying both of a wide scanning range and a high z-direction resonant frequency.

What is claimed is:

1. A microscopic area scanning apparatus provided with at least three hollow cylindrical piezoelectric elements each driven in three XYZ directions by one of divided electrodes, said microscopic area scanning apparatus comprising:

three or more hollow cylindrical piezoelectric elements arranged on a circumference of a common plane;

a plurality of balls each axially provided at a free end of a respective one of the hollow cylindrical piezoelectric elements;

a plurality of ball retainers each rotatably and slidably holding a respective one of the balls in contact therewith;

a sample stage fixed to said ball retainers; and a table for fixing said hollow cylindrical piezoelectric elements on the circumference of the common plane, said table being provided at a fixed end of said hollow cylindrical piezoelectric element.

2. A microscopic area scanning apparatus according to claim 1, wherein each of said ball retainers has a recess having a bowl shape or a hole.

3. A microscopic area scanning apparatus according to claim 2, wherein each of said balls is formed by a permanent magnet or an electromagnet, each of said ball retainers is formed of a magnetic material, and each of said balls is rotatably and slidably held in said respective ball retainer in contact therewith by a magnetic force.

4. A microscopic area scanning apparatus according to claim 2, wherein each of said balls is formed by a magnetic member, each of said ball retainers is formed by a permanent magnet or an electromagnet, and each of said ball retainers rotatably and slidably holds therein said respective ball in contact therewith by a magnetic force.

5. A microscopic area scanning apparatus according to claim 1, further comprising pressure applying means for applying pressure to said balls.

6. A microscopic area scanning apparatus according to any one of claims 4–5, further comprising displacing error absorbing means for absorbing an error of displacement in a horizontal direction of the plurality of said hollow cylindrical piezoelectric elements.

7. A microscopic area scanning apparatus according to claim 6, wherein said displacing error absorbing means is formed by a ring member having a diameter greater than that of said sample stage, the ring member having a rigidity in radial direction thereof lower than that of said sample stage.

8. A microscopic area scanning apparatus according to claim 7, wherein said sample stage is inscriptively fixed to one inner point of said displacing error absorbing means.

9. A microscopic area scanning apparatus according to claim 8, wherein one of said ball retainers is fixed to a portion fixing said sample stage and said displacing error absorbing means, and the remaining ball retainers being fixed to the displacing error absorbing means.

10. A microscopic area scanning apparatus according to claim 9, wherein one or both of each of said balls and each of said ball retainers has a surface film formed of a soft metal or a solid lubricant.

* * * * *